May 21, 1935.   R. C. WHEELER   2,002,103
PIPE ANCHOR
Filed June 30, 1932

INVENTOR
Russell C. Wheeler
BY
Donald E. Payne
ATTORNEY

Patented May 21, 1935

2,002,103

UNITED STATES PATENT OFFICE 2,002,103

PIPE ANCHOR

Russell C. Wheeler, Hammond, Ind., assignor to Standard Oil Company, Chicago, Ill., a corporation of Indiana Application June 30, 1932, Serial No. 620,113

3 Claims. (Cl. 137—75)

This invention relates to a pipe anchor and it pertains more particularly to a support for hot oil lines or other conduits which are subject to extreme temperature changes, vibrations and/or reversals of stress.

In petroleum refineries it is necessary to transfer liquids at extremely high temperatures, for example, the pressure tar lines from cracking stills must carry a fluid at about 700–800° F. When this line is shut down for cleaning, for repair or for replacement its temperature may fall in the winter time to below 0° F. This temperature change causes a considerable expansion or contraction of the pipe, both circumferentially and longitudinally. To compensate for the longitudinal expansion or contraction, large U-shaped bends are provided between the various points at which the pipe is anchored. Heretofore the pipes have been anchored by means of a clamp welded thereto around the complete circumference, just as a sleeve is welded to a pipe. This produces a weakened spot at the point of fusion of the weld. Vibration and stress reversal caused by temperature changes or by mechanical means frequently cause the pipe to break at this point of fusion of the weld.

The object of my invention is to provide a pipe anchor which will prevent both longitudinal and circumferential movement of the pipe without weakening it.

Another object is to provide a pipe anchor wherein an operator may securely weld the anchor to a pipe from a position above the pipe. This feature obviates the inconvenience and danger attendant to the welding of pipe anchors formerly encountered in securing such pipe anchors as required circumferential welding to the pipe, thus calling upon the operator to introduce his welding torch to the anchor and pipe from a point beneath the pipe.

A further object is to provide a pipe anchor which lies closely along the outer wall of the pipe so as to readily permit of the extension of the pipe insulating tubes or insulating material about the adjacent portions of the anchor at the anchor points of the pipe.

I accomplish these objects by providing an improved pipe anchor design which eliminates circumferential welding. Instead of employing the conventional sleeves I use an anchor having tongues or lateral projections extending longitudinally along the pipe and I secure these tongues to the pipe by means of longitudinal welds. These welds are readily accessible and they do not result in points of weakness.

Figure 1:
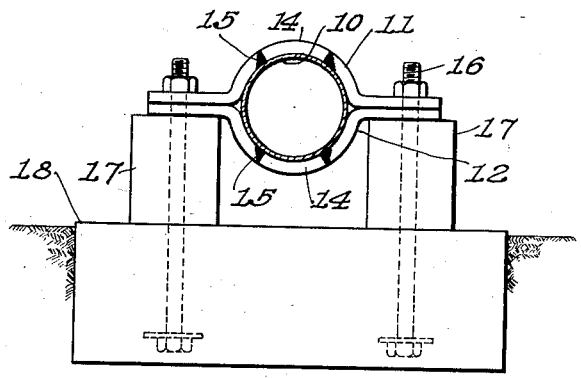
Figure 2:
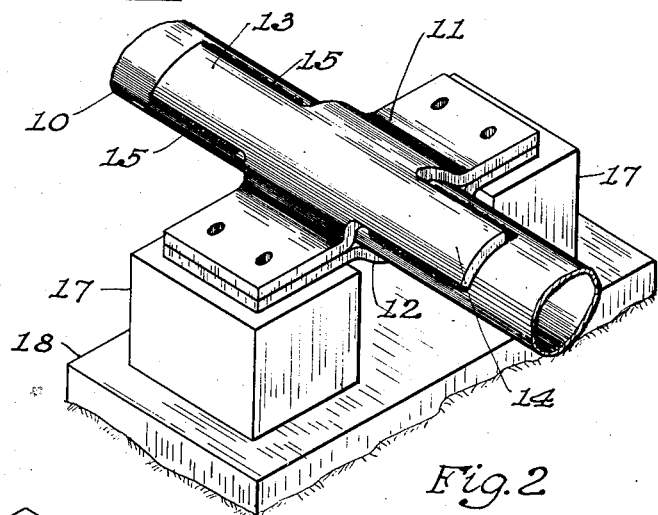
Figure 3:
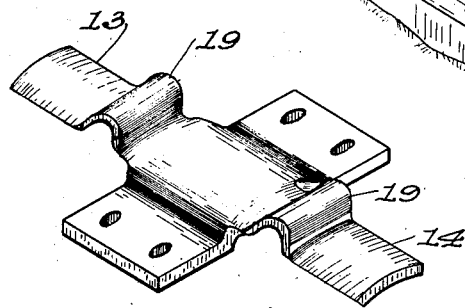
Figure 4:
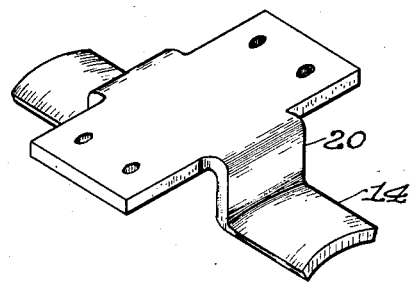

The invention will be more clearly understood from the following detailed description and from the accompanying drawing which form a part of this specification, and in which Figure 1 is a vertical section through the pipe showing the assembly in elevation, Figure 2 is an isometric detailed view, and Figures 3 and 4 are modified forms of the pipe anchor.

The invention is applicable to any conduit, but it is particularly useful for anchoring pipes which are subject to vibration or reversal of stresses. In my preferred example I will describe the application of my invention to a pressure tar line in a petroleum refinery, but it should be understood that the invention is equally applicable elsewhere.

Pipe 10 is held in position by upper and lower anchors 11 and 12 respectively,—the two anchors together forming a split clamp or yoke which, in the preferred embodiment, completely surrounds the pipe. It should be understood, however, that for some purposes the use of a single anchor will be sufficient.

Each anchor has two tongues or straps 13 and 14 extending longitudinally of the pipe. These anchors are secured to the pipe by longitudinal welds 15 along the sides of tongues 13 and 14 between the body of the anchor and the end of said tongues. The main body of the anchor is held in place by means of anchor bolts 16, set in concrete pedestals 17 on foundation 18.

Even the lower tongues may be welded from above, and there is no necessity for the welder to lie on his back under the pipe to make a difficult overhead weld.

It is a relatively simple matter to insulate a pipe which is anchored in this manner because the main body of the anchors may conform to the outside of the insulation,—it being only necessary for the extended tongues to be in contact with the pipe.

In Figure 3 I have shown a modified form of my invention wherein the tongues are provided with bent portions 19 which serve to take up small vibrations, and which allow a certain degree of resilience. In Figure 4 I have shown another modification wherein tongues 13 and 14 are offset by a spacing member 20. This serves the same function as bent portion 19 and it further serves to space the body of the anchor from the pipe so that it may be readily insulated.

The structure as hereinabove described is not only stronger and more easily applied than the pipe anchors heretofore used, but it offers the added feature of facilitating insulation and allowing for a small amount of flexibility without injury to either the pipe or the anchor.

While I have disclosed in detail a preferred embodiment of my invention it should be understood that I do not limit myself to said details except as defined by the following claims which should be construed as broadly as the prior art may permit.

I claim:

1. A pipe anchor which comprises a body portion, means for securing said body portion to a support, a tongue extending longitudinally of the pipe to be anchored and adapted for welding along its longitudinally extending edges to the pipe to be anchored, and an offset portion between said tongue and said body portion.

2. In apparatus of the class described, a plurality of pipe anchors, each of said anchors having a body portion adapted for disposition transversely of a pipe to be anchored and each having integral tongues extending away from said body and longitudinally of said pipe, means for securing said tongues to said pipe, and means associated with the body of the anchors for securing the anchors to a support in pairs to form a yoke about said pipe.

3. A pipe anchor comprising a body portion adapted to be disposed transversely of a pipe to be anchored and having its outer ends fashioned for engagement with anchor securing means, and a tongue formed integrally with said body and extending laterally from the mid-portion thereof longitudinally of said pipe and adapted for welding along its longitudinally extending edges to said pipe, said anchor having that portion between the tongue and body off-set to provide a yielding relationship between the tongue and body.

RUSSELL C. WHEELER.